United States Patent [19]

DiSalvo et al.

[11] 4,386,191
[45] May 31, 1983

[54] COMPOSITIONS FOR FORMING POLY(OXAZOLIDONE/URETHANE) THERMOSETS AND PRODUCTS THEREFROM

[75] Inventors: Anthony L. DiSalvo, Greenwich, Conn.; Chung-Chieh Tsai, South Salem, N.Y.

[73] Assignee: Stauffer Chemical Company, Westport, Conn.

[21] Appl. No.: 309,737

[22] Filed: Oct. 8, 1981

[51] Int. Cl.$^3$ .................. C08G 59/14; C08G 18/42; C08G 18/58

[52] U.S. Cl. .................. 525/504; 525/507; 528/73; 528/110; 528/297; 549/539; 549/556; 549/562

[58] Field of Search ............... 525/504, 507; 528/110, 528/73, 297; 549/539, 556, 562

[56] References Cited

U.S. PATENT DOCUMENTS

| | | | |
|---|---|---|---|
| 2,891,034 | 6/1959 | Fisch | 260/45.4 |
| 2,947,717 | 8/1960 | Belanger et al. | 260/45.4 |
| 3,142,657 | 7/1964 | Fisch | 260/45.4 |
| 3,294,865 | 12/1966 | Price | 260/837 |
| 3,299,008 | 1/1967 | Mueller | 260/78.5 |
| 3,523,143 | 8/1970 | Kwong | 260/835 |
| 3,576,903 | 4/1971 | Groff | 260/824 |
| 3,641,194 | 2/1972 | Schmid et al. | 260/835 |
| 3,687,897 | 8/1972 | Clarke | 528/73 X |
| 3,847,874 | 11/1974 | Murakami et al. | 260/77.5 AN |
| 3,905,945 | 9/1975 | Iseda et al. | 528/73 X |

Primary Examiner—Earl A. Nielsen
Attorney, Agent, or Firm—Richard P. Fennelly

[57] ABSTRACT

Reaction of a polyol, acid anhydride and diepoxide, preferably in a single step, yields a prepolymer composition containing a prepolymer containing terminal epoxy and non-terminal, secondary hydroxy groups. Reaction of this prepolymer with a polyisocyanate yields a poly(oxazolidone/urethane) thermoset composition which is essentially free of isocyanurate linkages. The thermoset contains oxazolidone linkages in the backbone of its recurring unit and urethane linkages which are present in a side chain of the unit.

17 Claims, No Drawings

COMPOSITIONS FOR FORMING POLY(OXAZOLIDONE/URETHANE) THERMOSETS AND PRODUCTS THEREFROM

BACKGROUND OF THE INVENTION

1. Field of the Invention

The present invention relates to compositions for the production of poly(oxazolidone/urethane) thermosets and to products prepared therefrom.

2. Description of the Prior Art

The prior art illustrates the sequential reaction of polyol, acid anhydride and polyepoxy compound to form a prepolymer which is then cured. For instance, in U.S. Pat. No. 3,576,903 to G. L. Groff the first step of the reaction to form the prepolymer involves reaction of acid anhydride and polyhydroxy compound to yield an acid-terminated polymer. This acid-terminated polymer is then reacted with an epoxy compound such that at least two epoxide equivalent weights are present for each carboxyl equivalent weight of acid-terminated polymer. Groff then teaches curing of this prepolymer by use of an active hydrogen compound known to react with epoxy resins (e.g., polybasic acids, cyclic anhydrides, cyclic dianhydrides, and aromatic or aliphatic diamines) rather than with any compound containing an isocyanate group.

The formation of polymers containing oxazolidone and urethane linkages by reaction of a polyisocyanate with a prepolymer formed by a two step reaction involving (1) reaction of a dicarboxylic acid or anhydride (e.g., phthalic anhydride) and saturated dihydric alcohol followed by (2) reaction with a diepoxide is described in U.S. Pat. No. 3,847,874 to Y. Murakami et al. The reaction conditions described in this patent yield a prepolymer which contains a hydroxy group at one end and a terminal epoxide group with adjacent secondary, non-terminal hydroxy group at the other end. A diisocyanate will react with such a prepolymer to form a recurring polymer unit containing urethane and oxazolidone linkages in the backbone and urethane side chains.

SUMMARY OF THE PRESENT INVENTION

The present invention relates to a single step process for forming epoxy and hydroxy group containing prepolymers by reaction of a polyol, an acid anhydride, and a diepoxy compound. The prepolymer has epoxy and hydroxy groups, the epoxy groups being in a terminal position and the hydroxy groups being secondary and in a non-terminal position. The prepolymer contains ester linkages (due to the anhydride reactant).

Certain of the resulting compositions formed by reaction of polyisocyanate and prepolymer are also part of the present invention.

The present invention also relates to reaction mixtures comprising a polyisocyanate and the above-described epoxy and hydroxy-group containing prepolymer formed by either the single stage or sequential reaction of polyol, acid anhydride, and diepoxy compound. Reaction of the polyisocyanate with such a prepolymer yields a poly(oxazolidone/urethane) thermoset which is substantially free of isocyanurate linkages. The oxazolidone rings form in the polymer backbone due to reaction of the terminal epoxy groups with isocyanate groups, said oxazolidone groups being separated from one another by more than two ester linkages. This polymer composition also forms a part of the present invention.

DESCRIPTION OF THE PREFERRED EMBODIMENTS

The poly(oxazolidone/urethane) compositions of the present invention are formed by reacting a polyisocyanate with a prepolymer composition containing a prepolymer having terminal epoxy groups and non-terminal, secondary hydroxy groups. The prepolymer is formed by reaction of polyol, acid anhydride, and diepoxide in either a sequential reaction in which the polyol and acid anhydride are reacted to form an acid terminated adduct which is then reacted with diepoxide. Preferably, however, polyol, acid anhydride and diepoxide are reacted in a novel one-step procedure to yield the substantially acid free prepolymer which can be then reacted with polyisocyanate.

If the above-mentioned two step procedure for forming the prepolymer from polyol, acid anhydride and diepoxide is chosen, the same general process described in U.S. Pat. No. 3,576,903 to G. L. Groff can be employed. The disclosure of that patent is incorporated herein by reference in regard to formation of the epoxy terminated polymers described therein.

In the preferred one step process of the present invention the polyol, acid anhydride and diepoxide are all reacted together so as to produce the desired prepolymer composition containing a prepolymer containing terminal epoxy groups and non-terminal, secondary hydroxy groups. This prepolymer composition should be essentially free of acid groups and should be curable to the desired poly(oxazolidone/urethane) thermoset when combined with polyisocyanate. If one expresses the molar amounts of material needed to give that result one arrives at reaction of 2 equivalents of hydroxy as polyol with 2 moles or less of anhydride and 2 moles or more of diepoxide. Use of such amounts of the various reagents will produce the following prepolymer as the major prepolymer component in the composition, with $R_1$–$R_5$ independently being any group to which carbon atoms can be covalently bound (alkylene, arylene, alkylene/arylene, etc.) and R being the same as well as hydrogen:

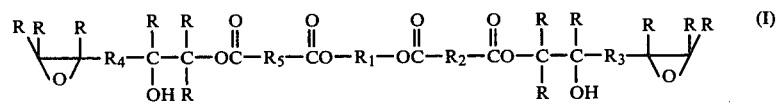

(I)

Formation of this prepolymer is favored when the molar amount of anhydride is no more than 2 and the amount of diepoxide is not less than that of acid anhydride, based upon 2 equivalents of polyol hydroxyl groups.

Depending upon the precise amounts of reactants employed, however, it is also possible to yield a prepolymer in which one end contains a terminal epoxy group with associated non-terminal, hydroxy group, and the other end terminates in a hydroxy group. This prepolymer has the formula given below with R-$R_3$ having the same meaning as R-$R_5$, above:

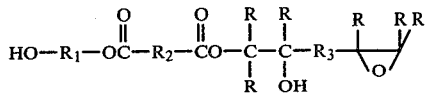

(II)

This type of prepolymer is produced in the process shown in U.S. Pat. No. 3,847,874 to Y. Murakami and is favored in the reaction when the molar amount of acid anhydride is present in amounts which approximate one half the number of equivalents of polyol hydroxyl groups present.

The present invention includes prepolymer compositions which contain mixtures of both of the aforementioned prepolymers. Such mixtures are not obtainable using the processes shown in either of U.S. Pat. Nos. 3,576,903 or 3,847,874.

A wide variety of diepoxides, acid anhydrides and polyols can be selected for use in the practice of the present invention.

Representative acid anhydrides which can be chosen encompass both the aromatic and aliphatic anhydrides including: succinic, adipic, maleic, glutaric, sebacic, phthalic, tetrachlorophthalic, and tetrabromophthalic.

Representative polyols include: polyethylene glycol, polypropylene glycol, 1,4-butanediol, pentaerythritol, 2,3-butanediol, ethylene glycol, propylene glycol, trimethylene glycol, 1,4-dihydroxy-2-butene, 1,12-dihydroxyoctadecane, 1,4-dihydroxycyclohexane, 2,2-dimethyl-1,3-propanediol, 2-ethyl-2-butylpropanediol, glycerol, erythritol, sorbitol, mannitol, inositol, trimethylol propane, dipentaerythritol, polybutadiene diol, polytetramethylene diol, polycaprolactone diol and phosphorus containing diols and polyols.

The type of diepoxides shown in U.S. Pat. No. 4,066,628 to K. Ashida et al., which is incorporated herein by reference, can be employed for use in connection with the present invention. Such diepoxides include the diglycidyl ethers of dihydric mononuclear and fused ring phenols, the diglycidyl ethers of non-fused polynuclear phenols having an alkylene, sulfone, carboxy, oxygen or sulfur bridging group between the phenol rings, the diglycidyl ethers of novolac resins, dicyclopentadiene dioxide, vinyl cyclohexane dioxide, the dicyclohexyl oxide carboxylates, and the diglycidyl derivatives of aromatic primary amines. Some representative diepoxides include the diglycidyl ethers of bisphenol A, hydroquinone, resorcinol, catechol, methylhydroquinone, 1,6-hexanediol, and 1,12-dodecanediol, alicyclic diepoxides, such as vinylcyclohexene dioxide, and dicyclopentadiene dioxide.

The prepolymer composition is formed in the single step process of the present invention by mixing the polyol, anhydride and diepoxide, preferably in the presence of an effective amount (0.02 to 2%, by weight of all the reaction ingredients) of a catalyst designed to promote the reaction. Representative catalysts tending to favor oxazolidone formation include the quaternary ammonium salts (e.g., tetramethyl ammonium chloride); the metal alkoxides (e.g., lithium n-butoxide); the metal halides and their complexes (e.g., lithium chloride/hexamethylphosphoramide complex); and the organometallic compounds (e.g., trialkyl aluminum). Catalysts which favor urethane formation include the organotin compounds, diamines, and polyamines.

Once the prepolymer composition has been formed it is combined with a desired polyisocyanate to form a reaction mixture from which the poly(oxazolidone/urethane) thermoset compositions of the present invention can be formed. If desired, the reaction medium can contain up to about 60%, by weight, of other materials which do not interfere with the reaction of the prepolymer and polyisocyanate. Representative ingredients include additional diepoxide or polyepoxide (functions as a solvent, if liquid), polyol, and acrylate or methacrylate ester polymer to impart flexibility to the final product. If desired the reaction medium can also contain up to about 10%, by weight, of one or more of the following additives: blowing agents, flame retardants, coupling agents, dyes, stabilizers and mold releasing agents.

The amount of polyisocyanate chosen for reaction with the prepolymer should be substantially equivalent in regard to its isocyanate functionality (on an equivalent basis) to the total equivalents of epoxide and hydroxy groups in the prepolymer composition and any added ingredients which would react with the isocyanate. A slight excess of isocyanate (up to about 5% on a weight basis) can be tolerated but greater amounts should be avoided since the formation of isocyanurate linkages would be favored. In general, the respective molar amount of oxazolidone and urethane linkages to one another in the thermoset will depend upon the type or types of prepolymers present and the presence of other isocyanate reactive groups added to the reaction mixture. If only the prepolymer composition and polyisocyanate are used and the diepoxy/dihydroxy prepolymer is present, a 50:50 (oxazolidone:urethane) molar ratio polymer is produced. If the prepolymer composition contains the dual hydroxy, epoxy prepolymer to a greater degree, a greater number of urethane linkages will be formed as compared to oxazolidone linkages, unless additional epoxy moieties are added. Addition of additional hydroxy group compounds, e.g., polyol, will yield a larger molar amount of urethane, whereas addition of epoxide materials, e.g., diepoxides, will increase the oxazolidone content of the product. The molar amount of oxazolidone to urethane can range from 90:10 to 2:98. When the molar amount of hydroxy groups in the polyol is 2, the amount of anhydride should not exceed about 2 and the amount of diepoxide should not be less than that of anhydride.

Any polyisocyanate capable of reaction with the epoxy and hydroxy groups contained in the prepolymer to form the desired oxazolidone and urethane linkages is contemplated for use by the present invention. Representative examples of suitable conventional polyisocyanates, which are used to form urethane polymers, for example, include such aromatic and aliphatic types as: the tolylene diisocyanates, such as 2,4-tolylene diisocyanate and 2,6-tolylene diisocyanate, the methylene bis(phenyl isocyanates), such as methylene bis(4-phenyl isocyanate), dianisidine diisocyanate, toluidine diisocyanate, m-xylene diisocyanate, 1,5-napthylene diisocyanate, p-phenylene diisocyanate, and hexamethylene diisocyanate and other di- and higher polyisocyanates. Mixtures of such isocyanates can be used, if desired as well as polymeric polyisocyanates.

The resulting thermoset composition formed from the above-described reaction mixture is one which contains oxazolidone and urethane linkages in the recurring unit or units and which is essentially free of substantial amounts of isocyanurate linkages. The ultimate type of recurring unit and its amount will be dictated by the type of prepolymer or prepolymers mainly present in the prepolymer composition. Prepolymer (I) described above will produce a recurring unit of the following formula with R-R$_5$ having the same meaning as R$_1$-R$_5$ and R$_6$-R$_{17}$ are independently the same as R$_1$-R$_5$ and also include hydrogen:

The thermoset compositions of the present invention are useful in the fabrication of molded articles of manufacture, for example, by reaction injection molding techniques. If desired, the thermoset compositions can

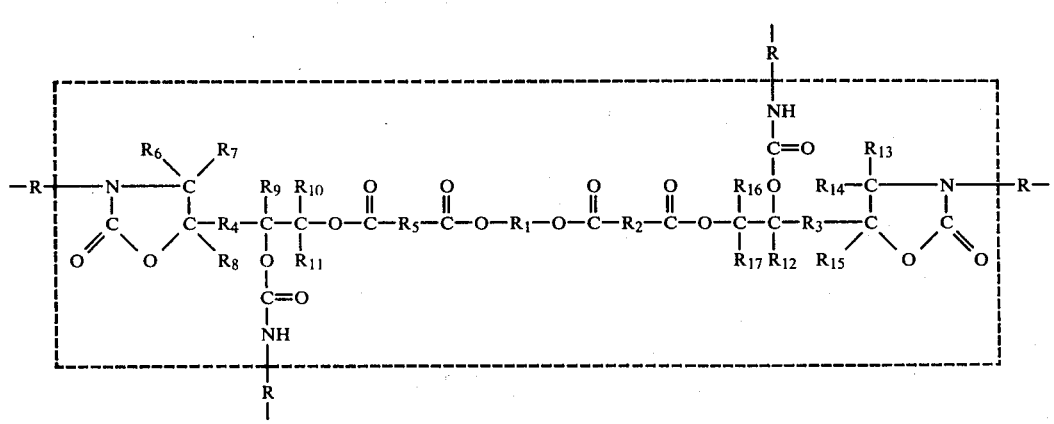

(III)

Presence of prepolymer (II) will yield the following recurring unit with R-R$_3$ having the same meaning as R$_1$-R$_3$ and R$_4$-R$_9$ are the same and also include hydrogen:

be combined with suitable reinforcing agents including glass fibers or flakes, graphite, wollastonite, mica, KELVAR aromatic polyamide fiber, nylon fiber, either alone or in combination with one or more coupling

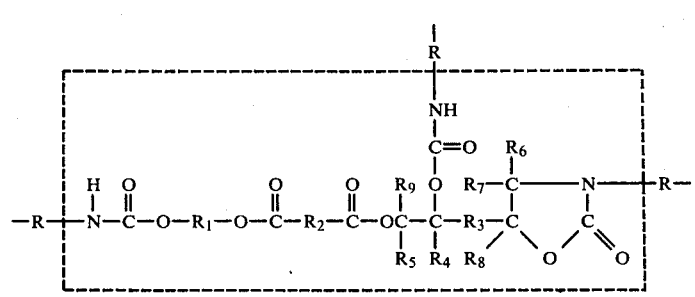

(IV)

Prepolymer compositions containing both prepolymers (I) and (II) would have a certain defined amount of both recurring units (III) and (IV) depending on the amounts of prepolymers (I) and (II) in the composition reacted with the polyisocyanate.

Recurring unit III has oxazolidone linkages in its backbone by virtue of reaction of the polyisocyanate with the terminal epoxy groups of prepolymer I. It has urethane groups in pendant side chains, rather than in the same chain as the oxazolidone, due to reaction of the pendant, non-terminal secondary hydroxy group in the prepolymer. The oxazolidone linkages in the recurring unit III are separated from one another by the additional presence in the backbone of ester linkages which are derived from the anhydride reactant.

Recurring unit IV has a urethane linkage adjacent one end of the backbone of the recurring unit and an oxazolidone linkage at the other end. A urethane linkage exists in a side chain of the unit intermediate the urethane and oxazolidone linkages. Ester linkages lie in the backbone intermediate the oxazolidone linkages in the backbone and the urethane linkages in the side chain.

Poly(oxazolidone/urethane) thermoset compositions which form a part of the present invention include those which contain recurring unit III, either alone, or in combination with no more than about 90% of IV.

agents.

The present invention is illustrated by the Examples which follow.

EXAMPLE 1

A mixture of 148 grams (1.0 equivalent weights) of phthalic anhydride, 305 grams (1.02 hydroxy equivalent weights) of polyethylene glycol (ave. mol. wt. 600), 385 grams (1.01 epoxy equivalent weights) of the diglycidyl ether of bisphenol A (EPON 828 brand from Shell Chemical Co.), and 3.3 grams of methyltrialkyl (C$_8$-C$_{10}$) ammonium chloride catalyst (ADOGEN 464 brand from Sherex Chemical Company, Inc.) was heated at 122° C.-130° C. After 40 minutes of heating, the resulting product was found to be free of acidic material, and it had an epoxide equivalent of 927.

A mixture of 107.1 grams (0.116 epoxide equivalent weights) of the above prepolymer, 45.9 grams (0.459 hydroxy equivalent weights) of polyethylene glycol (mol. wt. 200), and 8 mg. of dibutyltin dilaurate was stirred under vacuum with 96 grams (0.691 isocyanate equivalent weights) of 4,4'-diphenyl methane diisocyanate (ISONATE 191 brand from Upjohn Chemical Co.). The final mixture was poured into a preheated mold (100° C.) and placed in an oven at 120° C. The resin cured in 1 minute and was demolded and postcured at 120° C. overnight. The thermoset plaque (3.18 mm. thick) gave 660.21 kg/cm$^2$ of tensile strength (ASTM D412), 27.77×10$^3$ kg/cm$^2$ of flexural modulus (ASTM D474), and 0.47 J/cm of notched IZOD (ASTM D256).

EXAMPLE 2

The prepolymer product of Example 1 was formulated with a chain extender and catalyst(s) as shown in Table 1. These formulations were mixed with the stoichiometric amount of 4,4'-diphenyl methane diisocyanate (ISONATE 191 brand), and the mixtures were poured into a preheated mold (50° C.–120° C.). The curing times are described in the Table:

TABLE 1

Formulations of Prepolymer Product of Example 1 and the Curing Time for the Reaction of Each Formulation with ISONATE 191 Diisocyanate

| Sample | Wt. of Prepolymer | Wt. of Chain Extender | Wt. of Catalyst(s) | Wt. of ISONATE 191 | Curing Time Min. |
|---|---|---|---|---|---|
| 1 | 106.4 gm. | 26.69 gm$^{(1)}$ | 8 mg$^{(3)}$ | 115 gm. | 2 |
| 2 | 84.7 gm. | 36.3 gm$^{(1)}$ | 12 mg$^{(3)}$ | 139 gm. | 1 |
| 3 | 100.8 gm. | 43.2 gm$^{(2)}$ | 14 mg$^{(3)}$ 0.31 gm.$^{(4)}$ | 93 gm. | 1 |
| 4 | 83.6 gm. | 35.8 gm$^{(1)}$ | 12 mg$^{(3)}$ 0.66 gm.$^{(4)}$ | 138 gm. | 1 |

Chain Extenders and Catalysts:
$^{(1)}$BDO: 1,4 butanediol
$^{(2)}$PEG-200: polyethylene glycol (Ave. Mol. Wt. 200)
$^{(3)}$DBTDL: dibutyltin dilaurate
$^{(4)}$ADOGEN 464: a quaternary ammonium salt available from Sherex Chemical Company, Inc.

EXAMPLE 3

A mixture of 59.2 gm. (0.4 equivalent weights) of phthalic anhydride, 217.5 gm. (0.6 hydroxy equivalent weights) polypropylene glycol (ave. mol. wt. 725), 382 gm. (2 epoxy equivalent weights) of EPON 828 diepoxide, and 2.93 gm. of ADOGEN 464 catalyst was heated at 120°–130° C. After 40 minutes of heating, the resulting product was found to be free of acidic material and had an epoxide equivalent of 457.

A mixture of 177 gm. (0.387 epoxide equivalent weights) of the above prepolymer, 0.32 gm. of ADOGEN 464 catalyst, and 45 mg. of stannous octoate was stirred with 67.8 gm. (0.561 isocyanate equivalent weights) of ISONATE 191 diisocyanate. The final mixture, when homogeneous, was poured into a preheated mold (80° C.) and placed in an oven at 120° C. The resin cured in 3 minutes and was demolded and post-cured in the same oven overnight.

EXAMPLE 4

A mixture of 148 grams (1 equivalent weight) of phthalic anhydride, 200 grams (1 hydroxy equivalent weight) of polyethylene glycol (ave. mol. wt. 400), 268 grams (2 epoxy equivalent weights) of 1,4 butane diglycidyl ether and 2.46 grams of ADOGEN 464 catalyst was heated at 110° C.–115° C. After 80 minutes of heating, the resulting product was free of acid or acid anhydride. The product was cooled, and it had an epoxide equivalent of 669.

A mixture of 77.7 grams (0.116 epoxide equivalent weights) of the above prepolymer, 33.3 grams (0.739 hydroxy equivalent weights) of 1,4 butanediol (mol. wt. 90.1), and 8 mg of dibutyltin dilaurate was stirred under vacuum with 135 grams (0.971 isocyanate equivalent weights) of ISONATE 191 diisocyanate. The final mixture was poured into a preheated mold (80° C.) and placed in an oven at 115° C. The resin cured in 2 minutes and was demolded and post-cured at 115° C. overnight. The thermoset plaque (3.18 mm. thick) gave 757.24 kg/cm$^2$ of tensile strength (ASTM D412) 27.07×10$^3$ kg/cm$^2$ of flexural modulus (ASTM D474), and 0.801 J/cm of notched IZOD (ASTM D256).

EXAMPLE 5

A mixture of 221 grams (1.49 equivalent weights) of phthalic anhydride, 304 grams (1.52 hydroxy equivalent weights) of polyethylene glycol (ave. mol. wt. 400), 588 grams (3.08 epoxy equivalent weights) of EPON 828 diepoxide composition and 4.45 grams of ADOGEN 464 catalyst was heated at 108° C.–122° C. After 25 minutes of heating, the resulting product was free of acid or acid anhydride. The prepolymer product was cooled down, and it had an epoxide equivalent of 754.

A mixture of 98 grams (0.13 epoxide equivalent weights) of the above prepolymer, 42 grams (0.42 hydroxy equivalent weight) of polyethylene glycol (mol. wt. 200), and 14 mg. of dibutyltin dilaurate was stirred under vacuum with 95 grams (0.683 isocyanate equivalent weights) of ISONATE 191 diisocyanate. The final mixture was poured into a preheated mold (100° C.) and placed in an oven at 120° C. The resin cured in ½ minute and was demolded and post-cured at 125° C. for 3 hours. The thermoset plaque (3.18 mm. thick) gave 774.46 kg/cm$^2$ of tensile strength (ASTM D412), 29.46×10$^3$ kg/cm$^2$ of flexural modulus (ASTM D474), and 0.747 J/cm of notched IZOD (ASTM D256).

EXAMPLE 6

A mixture of 186 grams (1.26 equivalent weights) of phthalic anhydride, 628 grams (1.26 hydroxy equivalent weights) of polytetramethylene glycol (ave. mol. wt.: 1000), 480 grams (2.52 epoxy equivalent weights) of EPON 828, and 8.5 grams of lithium chloride hexamethylphosphoramide (1:1) complex was heated at 121° C.–128° C. After 60 minutes of heating, the resulting product was free of acid or acid anhydride. The product was cooled and it had an epoxide equivalent of 1111.

A mixture of 84 gm. (0.076 epoxide equivalent weights) of the above prepolymer, 36 gm. (0.80 hydroxy equivalent weights) of 1,4 butanediol, and 63 mg. of stannous octoate was stirred under vacuum followed by mixing with 132 gm. (0.95 isocyanate equivalent weights) of ISONATE 191 diisocyanate. The final mixture was poured into a preheated mold held at 110° C. The resin cured at that temperature in 30 seconds and was demolded and post-cured at 150° C. for 1 hour.

EXAMPLE 7

A mixture of 211 gm. (1.43 equivalent weights) of phthalic anhydride, 405 gm. (1.35 hydroxy equivalent weights) of polyethylene glycol (ave. mol. wt. 600), 100 gm. (0.10 hydroxy equivalent weights) of polytetramethylene glycol (POLYMEG 2000 brand from The Quaker Oats Company), 557 gm. (2.92 epoxy equivalent weights) of the diglycidyl ether of bisphenol A (EPON 828 brand), and 5.12 gm. of ADOGEN 464 catalyst was heated at 120°–130° C. The heating was continued for about 40 minutes until it was free of acid as determined by dissolving a small quantity (about 1 gm.) of the material in 30 ml. of acetone and titrating with a methanolic potassium hydroxide solution (0.5 N). The resulting product had an epoxide equivalent of 1045.

A mixture of 88 gm. (0.0847 epoxide equivalent weights) of the above prepolymer, 40 gm. (0.889 hydroxy equivalent weights) of 1,4-butanediol, 13 mg. of dibutyltin dilaurate, and 0.47 gm. of ADOGEN 464 catalyst was stirred under vacuum followed by mixing with 145 gm. (1.04 isocyanate equivalent weights) of ISONATE 191 diisocyanate. The mixture was then poured into a preheated mold held at 110° C. The mixture cured in 30 seconds and was demolded and post-cured for one hour at 145° C.

EXAMPLE 8

A mixture of 207 gm. (1.40 equivalent weights) of phthalic anhydride, 412 grams (1.37 hydroxy equivalents) of polyethylene glycol (ave. mol. wt.: 600), 103 gm. (0.0515 hydroxy equivalent weights) of polypropylene glycol (ave. mol. wt.: 4000), 537 gm. (2.81 epoxy equivalent weights) of the diglycidyl ether of bisphenol A, and 5.02 gm. of ADOGEN 464 catalyst was heated at 122°–127° C. for about 40 minutes until the product was free of acid or acid anhydride. The resulting product, a viscous liquid, had an epoxide equivalent of 1030.

A mixture of 76.7 gm. (0.0745 epoxide equivalent weight) of the above prepolymer, 33.0 gm. (0.733 hydroxy equivalent weights) of 1,4-butanediol, 14 mg. of dibutyltin dilaurate, and 0.40 gm. of ADOGEN 464 catalyst was stirred to make a homogeneous mixture. The mixture was added to 125 gm. (0.899 isocyanate equivalent weights) of ISONATE 191 diisocyanate. The resulting mixture was exothermic and was poured into a preheated mold held at 110° C. The resin cured in 30 sec. and was demolded and post-cured at 140° C. for one hour.

EXAMPLE 9

A mixture of 127 gm. (0.858 equivalent weight) of phthalic anhydride, 201 gm. (0.67 hydroxy equivalent weight) of polyethylene glycol (ave. mol. wt.: 600), 35.4 gm. (0.193 hydroxy equivalent weight) of 4,4'-isopropylidene bis(2,6-dichlorophenol), 335 gm. (1.75 epoxy equivalent weights) of the diglycidyl ether of bisphenol A, and 2.82 gm. of ADOGEN 464 catalyst was heated at 122°–129° C. for about 40 minutes until the resulting product was free of acid or acid anhydride. The product had an epoxide equivalent of 1100.

A mixture of 85 gm. (0.0773 epoxide equivalent weight) of the prepolymer formed above, 36.4 gm. (0.809 hydroxy equivalent weights) of 1,4-butanediol, 14 mg. of dibutyltin dilaurate, and 0.41 gm. of ADOGEN 464 catalyst was stirred to make a homogeneous mixture. The mixture was combined with 128 gm. (0.963 isocyanate equivalent weight) of modified 4,4'-diphenylmethane diisocyanate (MONDUR MR brand from Mobay Chemical Co.). The final mixture was exothermic and was poured into a heated mold (110° C.). The mixture cured in 30 sec. and was demolded and post-cured at 140° C. for one hour.

EXAMPLE 10

A mixture of 500 gm. (1.67 hydroxy equivalent weights) of polyethylene glycol (ave. mol. wt.: 600), and 167 gm. (1.67 equivalent weights) of succinic anhydride was heated under a dry atmosphere at 110° C. for 5½ hours. The resulting product had an acid equivalent of 393.

A mixture of 638 gm. (1.62 acid equivalent weights) of the above product, 606 gm. (3.25 epoxide equivalent weights) of the diglycidyl ether of bisphenol A (EPON 828 brand from Shell Chemical Company), and 5.0 gm. of methyltrialkyl ($C_8$–$C_{10}$) ammonium chloride (ADOGEN 464 brand from Sherex Chemical Company, Inc.) was heated at 110° C. for 4 hours til the product was free of acidic material. The product, a viscous liquid, had an epoxide equivalent of 785.

The prepolymer product was used as an ingredient to form a component (B) which was then reacted with a diisocyanate to produce oxazolidone-urethane thermoset compositions as shown in Table I. The component A was a modified methylene bis(4-phenylisocyanate) (ISONATE 191 brand from Upjohn Polymer Chemicals). The component B was a mixture of the prepolymer previously prepared, diol additive, catalyst and filler. The mixture of components A and B was stirred for a few seconds to make a homogeneous solution. The solution was immediately poured into a preheated glass mold (100° C.) which was coated by a thin film of tetrafluoroethylene (TEFLON brand) releasing agent. The residence time in the mold was about 2 minutes and the cured plaque was demolded and post-cured at a specified temperature for a certain period of time. Table I sets forth the ingredients used, post-curing conditions and physical properties of the resulting compositions:

TABLE I

| Plaque No.: | 1 | 2 | 3 | 4 | 5 |
|---|---|---|---|---|---|
| Ingredients (in gm.) | | | | | |
| Component A: | | | | | |
| Isonate 191[1] diisocyanate | 54 | 85 | 85 | 85 | 98 |
| Component B: | | | | | |
| Prepolymer | 152 | 160 | 160 | 160 | 149 |
| Polyethylene glycol (PEG 200 brand) | — | 20 | 20 | 20 | — |
| Glycerol | — | — | — | — | 10 |
| Milled glass fiber[2] | 39 | — | — | — | — |
| Dibutyltin dilaurate catalyst | — | — | — | 40* | — |
| Post Curing | | | | | |
| Temperature | 100° C. | 110° C. | 145° C. | 145° C. | 110° C. |
| Time | overnight | overnight | overnight | overnight | overnight |
| Properties | | | | | |
| Tensile Strength[3] (kg/cm$^2$) | 448 | 619 | — | 574 | 803 |
| Elongation (%) | 7.7 | 17.8 | — | 13.7 | 12.5 |
| Flexural Modulus[4] (kg/cm$^2$) | 20.1 × 10$^3$ | 20.0 × 10$^3$ | — | 20.5 × 10$^3$ | 27.2 × 10$^3$ |
| IZOD Impact[5] (joule/cm) | 0.37 | 0.64 | — | 0.69 | 0.37 |

*in parts per million, on a weight basis, based on the weight of all ingredients.
[1]ISONATE 191 is a modified methylene bis(4-phenylisocyanate) from Upjohn Polymer Chemicals. It has isocyanate equivalent of 138.7.
[2]Milled glass fiber is Fiberglas 739AB brand from Owens Corning.
[3]Tensile strength was measured in accordance with ASTM D412.
[4]Flexural Modulus was measured in accordance with ASTM D474.
[5]IZOD impact strength was measured in accordance with ASTM D256.

EXAMPLE 11

A mixture of 394 gm. (3.94 hydroxy equivalent weights) of polyethylene glycol (ave. mol. wt.: 200) and 394 gm. (3.94 equivalent weights) of succinic anhydride was heated under a dry atmosphere at 110° C. for 6 hours. The resulting product had an acid equivalent of 193.

A mixture of 420 gm. (2.18 acid equivalent weights) of the above product, 812 gm. (4.36 epoxy equivalent weights) of the diglycidyl ether of bisphenol A (EPON 828 brand) and 4.93 gm. ADOGEN 464 catalyst was heated at 110° C. for about 3 hours till the product was free of acid. The product, a light brown liquid, had an epoxide equivalent of 595.

The above prepolymer product was used to make plaques using the same procedure and the same testing methods set forth in Example 10 except for the ingredient changes set forth in Table II below:

TABLE II

| Plaque No.: | 6 | 7 | 8 | 9 |
|---|---|---|---|---|
| Ingredients (in gm.) | | | | |
| Component A: | | | | |
| Isonate 191 diisocyanate | 87.4 | 87.4 | 98.6 | 98.6 |
| Component B: | | | | |
| Prepolymer | 125 | 125 | 141 | 141 |
| Polyethylene glycol (PEG 600) | 63 | 63 | — | — |
| Fiberglas 739AB fiber | — | 52.5 | — | — |
| Polyethylene glycol (PEG 400) | — | — | 47.4 | 47.4 |
| Fiberglas 731[6] fiber | — | — | — | 31.9 |
| Post-Curing Temperature (overnight) | 110° C. | 110° C. | 145° C. | 125° C. |
| Physical Properties | | | | |
| Tensile Strength (kg/cm$^2$) | 628 | 616 | 722 | 588 |
| Elongation (%) | 15 | 7.8 | 16.3 | 5.3 |
| Flexural Modulus (kg/cm$^2$) | 22.0 × 10$^3$ | 28.5 × 10$^3$ | 24.9 × 10$^3$ | 30.5 × 10$^3$ |
| IZOD Impact (joule/cm) | 0.64 | 0.37 | 0.69 | 0.29 |

[6]Fiberglas 731 brand is a 0.16 cm milled glass fiber from Owens-Corning.

EXAMPLE 12

A mixture of 470 gm. (1.30 hydroxy equivalent weights) of polypropylene glycol (ave. mol. wt.: 725) and 131 gm. (1.30 equivalent weights) of succinic anhydride was heated under a dry atmosphere at 125° C. for 4 hours. The resulting product had an acid equivalent of 495.

A mixture of 578 gm. (1.17 acid equivalent weights) of the above product, 441 gm. of diepoxide (2.37 epoxide equivalent weights), and 4.08 gm. of ADOGEN 464 catalyst was heated at 115° C. for about 2 hours till the mixture was free of acid. The resulting product, a light brown liquid, had an epoxide equivalent of 934.

The above prepolymer product was used to make the following plaques employing the same procedure and the same testing methods set forth in Example 10 except for the ingredient changes set forth in Table III below:

TABLE III

| Plaque No.: | 10 | 11 | 12 | 13 | 14 |
|---|---|---|---|---|---|
| Ingredients (in gm.) | | | | | |
| Component A: | | | | | |
| ISONATE 191 diisocyanate | 79.7 | 79.6 | 80.4 | 73.0 | 145 |
| Component B: | | | | | |
| Prepolymer | 115 | 90 | 135 | 148 | 85 |
| Polyethylene glycol (PEG-300 brand) | 49.3 | — | — | — | — |
| Polyethylene glycol (PEG-200 brand) | — | 38.2 | — | — | — |
| Polyethylene glycol (PEG-400 brand) | — | — | 57.9 | — | — |
| Polyethylene glycol (PEG-600 brand) | — | — | — | 63.2 | — |
| Dibutyltin dilaurate | 67* | 67* | 51* | 49* | 56* |
| ADOGEN 464 catalyst | 0.27 | 0.26 | 0.28 | 0.26 | 0.46 |
| 1,4 butanediol | — | — | — | — | 36.5 |
| Post-curing temperature (overnight) | 140° C. | 135° C. | 140° C. | 140° C. | 130° C. |
| Properties | | | | | |
| Tensile strength (kg/cm$^2$) | 157 | 349 | 94 | 52 | — |
| Elongation (%) | 88.4 | 91.2 | 134.5 | 157.2 | — |
| Flexural Modulus (kg/cm$^2$) | 2,336 | 11,540 | 358 | 110 | — |
| IZOD Impact (joule/cm) | 5.2 | 1.5 | 5.1 | 3.8 | — |

*in parts per million, on a weight basis, based on the weight of all ingredients.

EXAMPLE 13

A mixture of 420 gm. (1.98 hydroxy equivalent weights) of polypropylene glycol (ave. mol. wt.: 425) and 198 gm. (1.98 equivalent weights) of succinic anhydride was heated at 120° C. for 8 hours. The resulting product had an acid equivalent of 313.

A mixture of 580 gm. (1.85 acid equivalent weights) of the above product, 698 gm. (3.75 epoxide equivalent weights) of EPON 828 diepoxide, and 5.08 gm. of ADOGEN 464 catalyst was heated at 110° C. for about 3 hours till the mixture was free of acid. The resulting product had an epoxide equivalent of 751.

The above prepolymer product was employed for making the following plaques using the same procedure and the same testing methods set forth in Example 10 except for the ingredient changes set forth in Table IV below:

TABLE IV

| Plaque No.: | 15 | 16 | 17 | 18 |
|---|---|---|---|---|
| Ingredients (in gm.) | | | | |
| Component A: | | | | |
| ISONATE 191 diisocyanate | 95.1 | 95.6 | 96.2 | 102 |
| Fiberglas 731 fiber | — | — | — | 48.3 |
| Component B: | | | | |
| Prepolymer | 99 | 125 | 155 | 106 |
| Polyethylene glycol (PEG 200 brand) | 42.4 | — | — | 45.4 |
| Polyethylene glycol (PEG 300 brand) | — | 53.6 | — | — |
| Polyethylene glycol (PEG 400 brand) | — | — | 62 | — |
| ADOGEN 464 catalyst | 0.31 | 0.32 | 0.33 | 0.34 |
| Dibutyltin Dilaurate | 59* | 51* | 46* | 46* |
| Post-Curing Temperature (overnight) | 135° C. | 135° C. | 135° C. | 135° C.[7] |
| Properties | | | | |
| Tensile strength (kg/cm$^2$) | 628 | 531 | 394 | 621 |
| Elongation (%) | 13 | 10.2 | 40.8 | 7.1 |
| Flexural Modulus (kg/cm$^2$) | 24.8 × 10$^3$ | 22.0 × 10$^3$ | 14.5 × 10$^3$ | 40.3 × 10$^3$ |

TABLE IV-continued

| Plaque No.: | 15 | 16 | 17 | 18 |
|---|---|---|---|---|
| IZOD Impact (joule/cm) | 0.64 | 0.59 | 1.0 | 0.43 |

*in parts per million, on a weight basis, based on the amount of all ingredients.
[7]Plaque No. 18 was post-cured for 3 hours.

EXAMPLE 14

A mixture of 850 gm. (2.34 hydroxy equivalent weights) of polypropylene glycol (ave. mol. wt.: 725) and 347 gm. (2.34 equivalent weights) of phthalic anhydride was heated at 120° C. for 17 hours. The resulting product had an acid equivalent of 496.

A mixture of 548 gm. (1.10 acid equivalent weights) of the above product, 441 gm. (2.37 epoxide equivalent weights) of EPON 828 diepoxy, and 5.93 gm. of ADOGEN 464 catalyst was heated at 125° C. for about 40 minutes till the solution was free of acidic material. The product, a light brown viscous liquid, had an epoxide equivalent of 790.

The above prepolymer product was employed for making a plaque using the same procedure and the same testing methods set forth in Example 10 except for the ingredient changes set forth as follows: A mixture of 186 gm. (0.235 epoxide equivalent weights) of the prepolymer and 0.004 gm. of dibutyltin dilaurate catalyst was mixed with 59 gm. (0.425 isocyanate equivalent weights) of ISONATE 191 diisocyanate (Component A). The resulting mixture, after stirring, was poured into a preheated mold (100° C.). The cured plaque was post-cured at 130° C. overnight. The plaque gave 561 kg/cm² of tensile strength, 21,200 kg/cm² of flexural modulus and 0.48 joule/cm of IZOD impact.

EXAMPLE 15

A mixture of 43.3 gm. (0.151 equivalent weights) of tetrachlorophthalic anhydride, 29.2 gm. (0.197 equivalent weights) of phthalic anhydride, 112.8 gm. (0.376 hydroxy equivalent weights) of polyethylene glycol (ave. mol. wt.: 600), 144.6 gm. of diepoxide (0.757 epoxy equivalent weights), and 1.00 gm. of ADOGEN 464 catalyst was heated at 150°–160° C. for about 25 minutes until the product was free of acidic material. The resulting product, a viscous liquid, had an epoxide equivalent of 1070.

A mixture of 87.4 gm. (0.082 equivalent weights) of the prepolymer formed above, 38.5 gm. (0.856 hydroxy equivalent weights) of 1,4-butanediol, 11 mg. of dibutyltin dilaurate, and 0.55 gm. of ADOGEN 464 catalyst was stirred to make a homogeneous mixture. This mixture was combined with 143.6 gm. (1.035 isocyanate equivalent weights) of ISONATE 191 diisocyanate. The resulting mixture, after a short mixing, was poured into a preheated mold head at 80° C. The resin cured in 1 minute and was demolded and post-cured at 150° C. for 4 hours.

EXAMPLE 16

A mixture of 7.79 kg. (52.6 equivalent weights) of phthalic anhydride, 15.92 kg. (53.1 hydroxide equivalent weights) of polyethylene glycol (ave. mol. wt.: 600), 20.34 kg. (53.3 epoxy equivalent weights) of EPON 828 diepoxide, and 177 gm. of ADOGEN 464 catalyst was heated at 120° C.–150° C. in a 56.8 liter stainless steel reactor. After 30 minutes of heating, the resulting product was found to be free of acidic materials, and it had an epoxide equivalent of 818.

A mixture of 78.1 gm. (0.095 epoxide equivalent weights) of the above prepolymer, 33.5 gm. (0.744 hydroxy equivalent weights) of 1,4-butanediol, 13 mg. of dibutyltin dilaurate, and 0.41 gm. of ADOGEN 464 catalyst was stirred to make a homogeneous composition which was then mixed with 130 gm. (0.935 isocyanate equivalent weights) of ISONATE 191. The final mixture, after a thorough mixing, was poured into a preheated mold (80° C.). The resin cured in one minute and was demolded and post-cured at 160° C. for one hour. The thermoset plaque (3.18 mm. thick) had 804 kg/cm² of tensile strength (ASTM D412) and $27.4 \times 10^3$ kg/cm² of flexural modulus (ASTM D474).

EXAMPLES 17–20

In these Examples the same ingredients set forth in Example 16 were used with the exception that varying amounts of ADOGEN 464 catalyst were heated at a temperature above 120° C. for a certain period of time until the resulting product was free of acidic material. The Table which follows describes each of these runs and the resulting product:

TABLE

| | 17 | 18 | 19 | 20 |
|---|---|---|---|---|
| ADOGEN 464 catalyst (gm.) | 132.5 | 88.5 | 22.1 | 33.2 |
| Reaction Temp. (°C.) | 120–151 | 120–147 | 120–135 | 120–130 |
| Reaction Time (min.) | 35 | 76 | 260 | 180 |
| Epoxide equivalent | 865 | 897 | 960 | 908 |
| Brookfield Viscosity at 70° C. (poise)* | 140 | 130 | 134 | 130 |

*LVT model, No. 4 spindle, 30 rpm.

A mixture which contained 70 wt. % of the resulting prepolymer product, 30 wt. % of 1,4-butanediol and the proper amount of catalysts equivalent to about 6500 ppm. of ADOGEN 464 catalyst and 120 ppm. of dibutyltin dilaurate was mixed with a stoichiometric amount of ISONATE 191 diisocyanate to make thermoset plaques. The same procedures and test procedures set forth in Example 16 were used. The Table set forth below gives the results obtained on the thermosets:

TABLE

| | 17 | 18 | 19 | 20 |
|---|---|---|---|---|
| Tensile Strength (kg/cm²) | 848 | 769 | — | — |
| Elongation (%) | 13.8 | 14.8 | — | — |
| Flexural Modulus at Room Temp. (kg/cm²) | 29,273 | 26,952 | — | — |
| at 70° C. (kg/cm²) | 16,114 | 20,478 | — | — |
| Heat Sag* (cm.) | 2.15 | 2.0 | 2.4 | 2.6 |

*tests conducted on a 3.2 mm. × 25 mm. × 152 mm. specimen, with an overhang or unsupported section 102 mm. in length, at 132° C. for 60 min.

The Examples which are contained herein illustrate certain embodiments of the invention but should not be construed in a limiting sense. The scope of protection sought is set forth in the claims which follow.

What is claimed:

1. The reaction of polyol, acid anhydride and diepoxide, in a single step, to form a prepolymer containing two terminal epoxide groups and two nonterminal, secondary hydroxy groups.

2. The reaction of claim 1 wherein the polyol is selected from the group consisting of polyethylene glycol, polypropylene glycol, ethylene glycol, propylene glycol, and polytetramethylene glycol.

3. The reaction of claim 1 wherein the acid anhydride is selected from the group consisting of the aromatic and aliphatic acid anhydrides.

4. The reaction of claim 1 wherein the diepoxide is selected from the group consisting of the diglycidyl ethers of dihydric mononuclear and fused ring phenols, the diglycidyl ethers of novolac resins, dicyclopentadiene dioxide, vinylcyclohexene dioxide, the dicyclohexyl oxide carboxylates, and the diglycidyl derivatives of aromatic primary amines.

5. The reaction of claim 1 wherein the amount of equivalents of polyol hydroxyl is 2, the molar amount of acid anhydride is not in excess of about 2 and the molar amount of diepoxide is not less than that of the acid anhydride.

6. A non-cured prepolymer composition which is produced by any of the processes of claims 1–5 in which the composition is a mixture of prepolymers of the formulae:

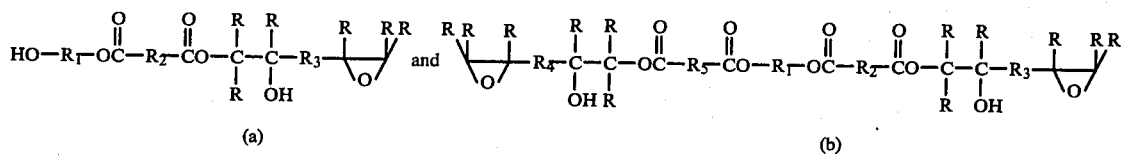

wherein any of $R_1-R_5$ are independently alkylene, arylene, and alkylene/arylene, and where R is the same as $R_1-R_5$ and also includes hydrogen.

7. A composition for the production of thermoset compositions containing oxazolidone and urethane linkages which comprises a polyisocyanate and a prepolymer composition containing a prepolymer with two terminal epoxy groups, two non-terminal, secondary hydroxy groups and ester linkages obtained by reacting a polyol, an acid anhydride, and a diepoxide.

8. A composition as claimed in claim 7 wherein the prepolymer composition contains a prepolymer of formula (b) shown in claim 6.

9. A composition as claimed in either of claims 7 or 8 which also contains in the prepolymer composition a prepolymer of formula (a) shown in claim 6.

10. A thermoset composition formed by the reaction of the composition in any of claims 7–8.

11. A thermoset composition formed by reaction of the composition in any of claims 7–8 which also contains a prepolymer of formula (a) shown in claim 6.

12. A thermoset composition containing oxazolidone and urethane linkages in its recurring unit which is essentially free of isocyanurate linkages, said oxazolidone linkages being present in the polymer backbone and separated from one another by ester linkages, said urethane linkages being present in a side chain attached to the polymer backbone.

13. A composition as claimed in claim 12 wherein the molar amount of oxazolidone to urethane ranges from about 90:10 to about 2:98.

14. A composition as claimed in claim 12 which further comprises at least one reinforcing agent.

15. A composition as claimed in claim 12 which contains a recurring unit having the formula:

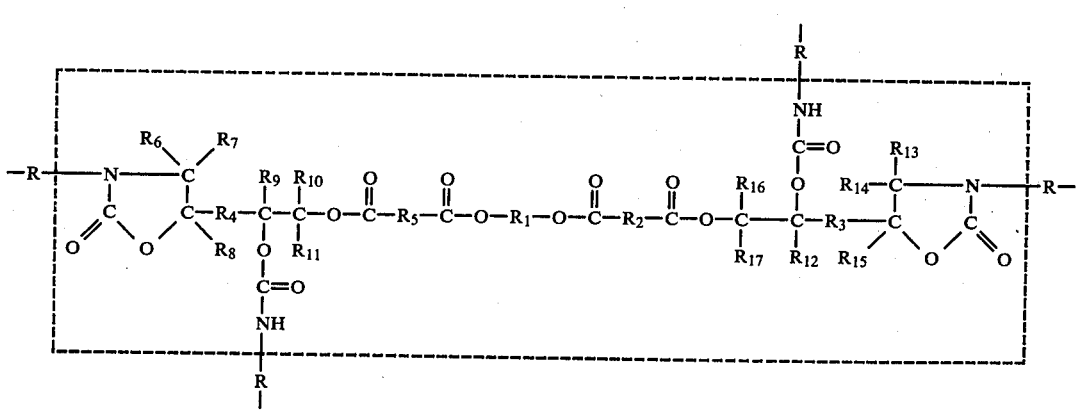

where R and $R_1-R_5$ are independently alkylene, arylene, and alkylene/arylene, and $R_6-R_{17}$ are the same as $R_1-R_5$ and also include hydrogen.

16. The composition of claim 12 which also contains a recurring unit of the formula:

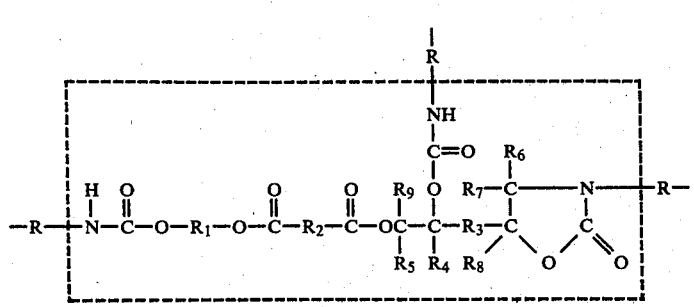
(IV)
where R and $R_1$–$R_3$ are independently alkylene, arylene, and alkylene/arylene, and $R_4$–$R_9$ are the same as R–$R_3$ and also include hydrogen.
17. A composition as claimed in any of claims 12–16 formed in a reaction injection molding process.
* * * * *